(12) United States Patent
Dalmia

(10) Patent No.: US 9,807,208 B2
(45) Date of Patent: Oct. 31, 2017

(54) ADAPTIVE RATE CONTROL OF NBASE-T DATA TRANSPORT SYSTEM

(71) Applicant: Aquantia Corporation, San Jose, CA (US)

(72) Inventor: Kamal Dalmia, Fremont, CA (US)

(73) Assignee: Aquantia Corp., Milpitas, CA (US)

(*) Notice: Subject to any disclaimer, the term of this patent is extended or adjusted under 35 U.S.C. 154(b) by 0 days.

(21) Appl. No.: 14/843,394

(22) Filed: Sep. 2, 2015

(65) Prior Publication Data

US 2015/0381777 A1   Dec. 31, 2015

Related U.S. Application Data

(63) Continuation of application No. 13/413,029, filed on Mar. 6, 2012, now Pat. No. 9,130,695.

(51) Int. Cl.
*H04L 29/08* (2006.01)
*H04L 1/00* (2006.01)
*H04L 12/40* (2006.01)
*H04L 12/891* (2013.01)

(52) U.S. Cl.
CPC .......... *H04L 69/323* (2013.01); *H04L 1/0001* (2013.01); *H04L 1/0002* (2013.01); *H04L 1/0006* (2013.01); *H04L 12/4013* (2013.01); *H04L 47/41* (2013.01); *H04L 2001/0094* (2013.01)

(58) Field of Classification Search
None
See application file for complete search history.

(56) References Cited

U.S. PATENT DOCUMENTS

| | | | | |
|---|---|---|---|---|
| 8,320,411 B1 * | 11/2012 | Sedarat | ............... | H04W 52/365 370/241 |
| 8,665,902 B2 * | 3/2014 | Powell | .................. | H04L 12/413 370/466 |
| 8,854,986 B1 * | 10/2014 | Langner | ................ | H04L 1/0002 370/248 |
| 2007/0192505 A1 * | 8/2007 | Dalmia | ................. | H04L 5/1446 709/233 |
| 2008/0034137 A1 * | 2/2008 | Whitby-Strevens | .. | G06F 13/387 710/100 |
| 2008/0310432 A1 * | 12/2008 | Ranjan | .................... | H04L 47/10 370/401 |
| 2009/0097389 A1 * | 4/2009 | Diab | ................. | H04L 12/40136 370/201 |
| 2009/0148161 A1 * | 6/2009 | Walker | .................. | H04J 3/1658 398/43 |

(Continued)

*Primary Examiner* — Ayaz Sheikh
*Assistant Examiner* — Mariela Vidal Carpio
(74) *Attorney, Agent, or Firm* — Lance Kreisman; Peninsula Patent Group

(57) ABSTRACT

A 10GBASE-T circuit is disclosed. The circuit includes a physical (PHY) integrated circuit and a media access control (MAC) integrated circuit. The PHY couples to a data transfer medium and carries out data transfers at a PHY data rate. The MAC integrated circuit controls access to the date transfer medium and couples to the PHY via a bidirectional link operating at a MAC data rate. Rate control logic detects the PHY data rate, and adjusts the MAC data rate to the PHY data rate. Changes to the PHY and MAC data rates may be made at rates higher than 1 Gbps.

9 Claims, 6 Drawing Sheets

(56) References Cited

U.S. PATENT DOCUMENTS

| | | | | |
|---|---|---|---|---|
| 2009/0187778 A1* | 7/2009 | Diab | ............... | G06F 1/3209 |
| | | | | 713/322 |
| 2010/0322105 A1* | 12/2010 | Diab | ............... | H04L 12/4625 |
| | | | | 370/254 |
| 2011/0206042 A1* | 8/2011 | Tarrab | ............... | H04L 12/2801 |
| | | | | 370/389 |
| 2011/0261814 A1* | 10/2011 | Matthews | ............... | H04L 47/6215 |
| | | | | 370/389 |
| 2012/0063295 A1* | 3/2012 | Bliss | ............... | H04L 1/0001 |
| | | | | 370/216 |
| 2012/0106345 A1* | 5/2012 | Diab | ............... | H04L 12/4625 |
| | | | | 370/236 |
| 2012/0170591 A1* | 7/2012 | Diab | ............... | H04L 12/40032 |
| | | | | 370/417 |

* cited by examiner

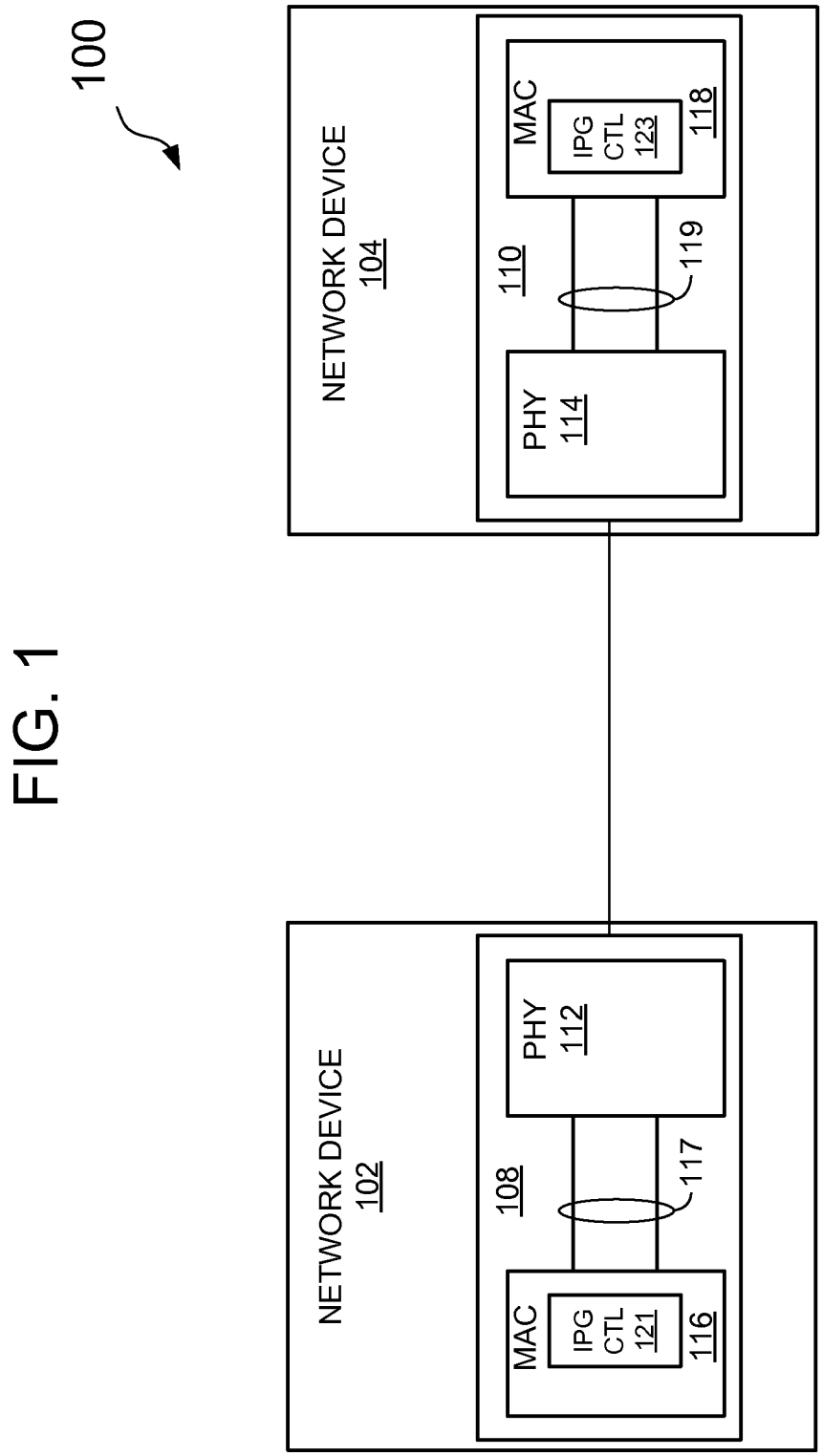

ADAPTIVE RATE CONTROL OF NBASE-T DATA TRANSPORT SYSTEM

TECHNICAL FIELD AND CROSS-REFERENCE TO RELATED APPLICATIONS

The disclosure herein relates generally to electronic communications, and more particularly to maintaining end-to-end data signaling rates in high-speed Ethernet communications. This application is a continuation of U.S. patent application Ser. No. 13/413,029, filed Mar. 6, 2012, titled ADAPTIVE RATE CONTROL OF 10GBASE-T DATA TRANSPORT SYSTEM, which is incorporated herein by reference in its entirety.

BACKGROUND

10GBASE-T is an Ethernet standard that provides a nominal data rate of 10 Gbit/s over twisted pair cables. A standard 10GBASE-T architecture enables multiple network devices to communicate via a link formed by conventional twisted pair copper wires. The wire-level modulation for 10GBASE-T is a Tomlinson-Harashima Precoded (THP) version of pulse-amplitude modulation with 16 discrete levels (PAM-16), encoded in a two-dimensional constellation pattern known as 128-DSQ (Double Square QAM).

The complex signaling scheme adopted by the 10GBASE-T standard works well for twisted pair cables made of higher quality materials and signal integrity characteristics. However, for lower quality cables, such as category 5 cabling, reaching the nominal data rate of 10 Gbit/s over appreciable distances can be problematic. In circumstances where the signal-to-noise ratio (SNR) for successful link operations is too low, the 10GBASE-T specification requires that the link renegotiate its operation to a mode that is backwards compatible with one or more older Ethernet standards that operate at much lower data rates. Thus, a first reduction in the data rate might occur at a level of 1000 Mbit/s (corresponding to 1GBASE-T), or even 100 Mbit/s. In many circumstances, a category 5 cable may support data rates much higher than 1 Gbps, although less than 10 Gbps. Thus, automatically renegotiating to a low data rate, when in fact a link may support much higher data rates, is inefficient.

Accordingly, what is needed is a system and method that provides more flexibility in scaling the data rates of 10GBASE-T Ethernet channels over various signaling media.

BRIEF DESCRIPTION OF THE DRAWINGS

FIG. 1 illustrates an end-to-end 10GBASE-T signaling link bounded by respective network devices;

DETAILED DESCRIPTION

Figure 2A:
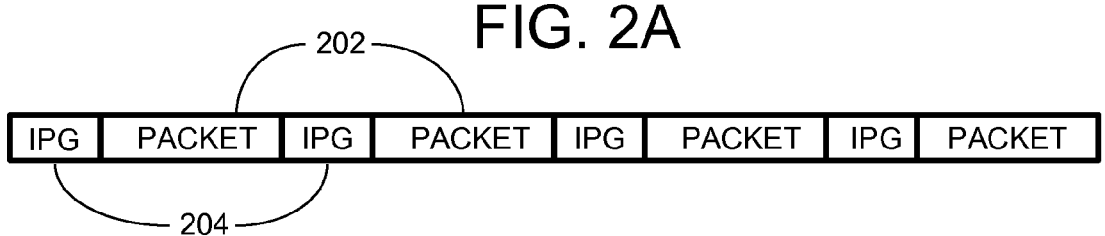
FIG. 2A illustrates a stream of data packets at a nominal data rate separated by inter-packet-gaps (IPG)

Embodiments of integrated circuits and associated methods of signaling along a 10GBASE-T link are disclosed. In one embodiment, a 10GBASE-T circuit is disclosed. The circuit includes a physical (PHY) integrated circuit and a media access control (MAC) integrated circuit. The PHY couples to a data transfer medium and carries out data transfers at a PHY data rate. The MAC integrated circuit controls access to the date transfer medium and couples to the PHY via a bidirectional link operating at a MAC data rate. Rate control logic detects the PHY data rate, and adjusts the MAC data rate to the PHY data rate. Changes to the PHY and MAC data rates may be made at rates higher than 1 Gbps.

In a further embodiment, a method of operation in a 10GBASE-T link is disclosed. The method includes transceiving first data between respective link partner PHY circuits at a PHY data rate; transferring second data between each PHY circuit and a corresponding primary MAC circuit at a MAC data rate, where the transferring includes generating streams of data packets separated by inter-packet gaps (IPG); detecting a change in the PHY data rate; communicating the change in the PHY data rate to the respective primary MAC circuits; and altering the MAC data rate to match the PHY data rate, wherein the change in the MAC data rate is free to be greater than 1 Gbps.

FIG. 1 illustrates an end-to-end 10GBASE-T link, generally designated 100, between two network devices 102 and 104. The devices communicate via a signaling link medium 106 such as a plurality of twisted pair cables that define separate physical channels. The link medium may be formed from cabling complying with various shielded or unshielded specifications, PCB routing paths, or the like. As will be explained below, the disclosure presented herein enables a wider variety of cabling types to be used with 10GBASE-T and experience non-nominal data rates far higher than older generations of Ethernet.

Each of the network devices includes respective network interface circuits 108 and 110 that communicate as link partners through respective physical (PHY) interfaces 112 and 114. The PHYs are typically embodied as integrated circuit transceiver chips having multiple transceiver circuits corresponding to the multiple twisted pair channels. The transceiver circuitry of each PHY transmits and receives data signals to and from the link partner PHY. The PHY circuits correspond to the physical, or Layer 1 layer of the Open Systems Interconnection (OSI) model.

With continued reference to FIG. 1, in one embodiment, each PHY 112 and 114 interfaces with respective media access controllers (MAC) 116 and 118 via respective multi-lane 10 Gbit Attachment Unit Interface (XAUI) signaling interfaces 117 and 119. The MAC forms part of the Data Link layer (Layer 2) of the OSI model, and generally controls how a computer on the network gains access to data and permission to transport it. One of the functions of the MAC involves organizing data streams consistent with applicable transport protocols. Another important function, as explained more fully below, involves flow control for data packets exchanged between the PHY circuits at PHY data rates. Proper flow control for the end-to-end link involves managing the MAC data rates to match the PHY data rates. This is important not only for static signaling operations, but especially for dynamic operations involving changing PHY data rates.

Further referring to FIG. 1, the MACs 116 and 118 include respective rate control logic circuits 121 and 123 that are responsive to data packet streams received from their associated PHY circuit. In one embodiment, the rate control logic includes an IPG controller that adjusts IPG frame widths and/or inserts additional IPGs into a data stream to control the MAC data rate. In other embodiments, the rate control logic may be separate from the MAC.

Referring now to FIG. 2A, a typical data stream between the MAC and PHY interfaces operating at a full 10 Gbps data rate includes data packets 202 bounded by one or more inter-packet-gaps (IPG) 204. Each IPG has a time interval duration specified by the transmit-side MAC. The MACs generally manage and vary the bandwidth, or data rate, up to a maximum rate depending on system data flow. Thus, for a maximum bandwidth mode of operation, and assuming a fully populated lane, IPG widths are minimized by the MAC.

Figure 2B:
FIG. 2B illustrates a stream of data packets at a second data rate separated by modified IPGs.

As more fully described below, however, in other modes of operation, the data rate between the link partner PHYs may be a rate other than nominal (10 Gbps). In such a circumstance, unless the MAC provides a way to adapt to the different rate, end-to-end communication over the link may be lost. FIG. 2B illustrates one way that the MAC accounts for a different PHY data rate—by modifying the width of the IPGs. Increased IPG intervals result in fewer data packets over a given period of time. By adjusting the IPG widths accurately, a variety of different maximum data rates may be managed by the MAC. In addition to modifying IPG widths, additional IPG frames may be inserted into the data stream to more flexibly adjust the possible MAC data rates, where adjustments to IPG interval widths provide fine control while inserting additional IPG frames provides coarse control.

Figure 3:
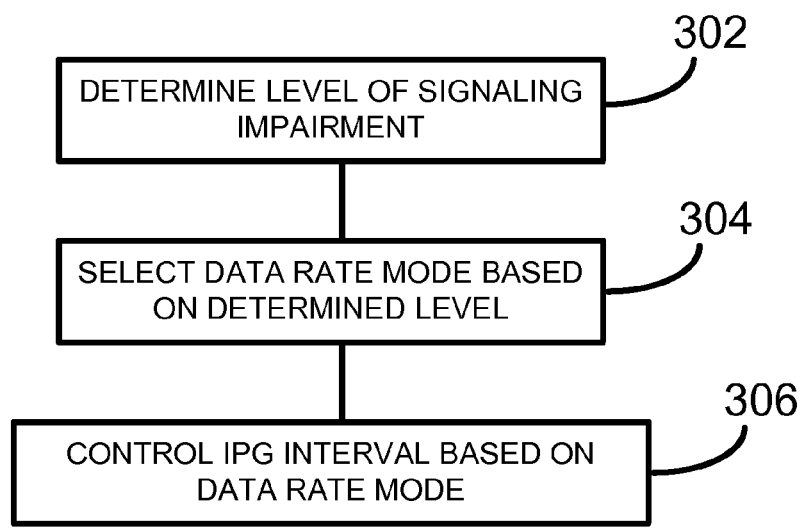
FIG. 3 illustrates a flowchart for a method of transferring 10GBASE-T symbols.

FIG. 3 illustrates a high-level flow diagram of a method of transferring data along a 10GBASE-T signaling link. At step 302, a determination is made as to the level of signaling impairment, if any, affecting the link. This may be made by noting the type of cabling used as the transport medium (such as CAT 5 cable versus CAT 6), or by detecting SNR or BER values during an initialization or calibration procedure. A PHY data rate mode is then selected based on the determined level of impairment, at step 304. To achieve end-to-end operability between both link partners, the MACs control IPG intervals based on the PHY data rate mode, at step 306. The process may be carried out as a static one-time only adjustment during link training, or as a dynamic adaptive process, such as that more fully described below.

Figure 4A:
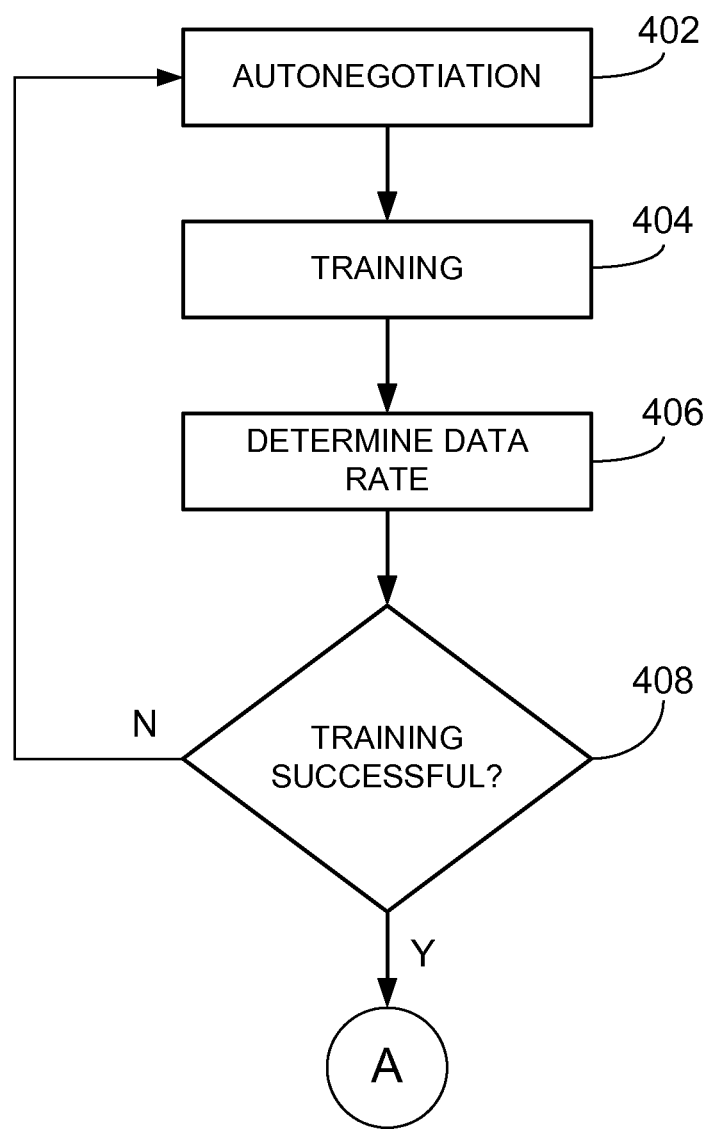
FIGS. 4A-4C illustrate sequences of detailed steps to carry out the method of FIG. 3.
Figure 4B:
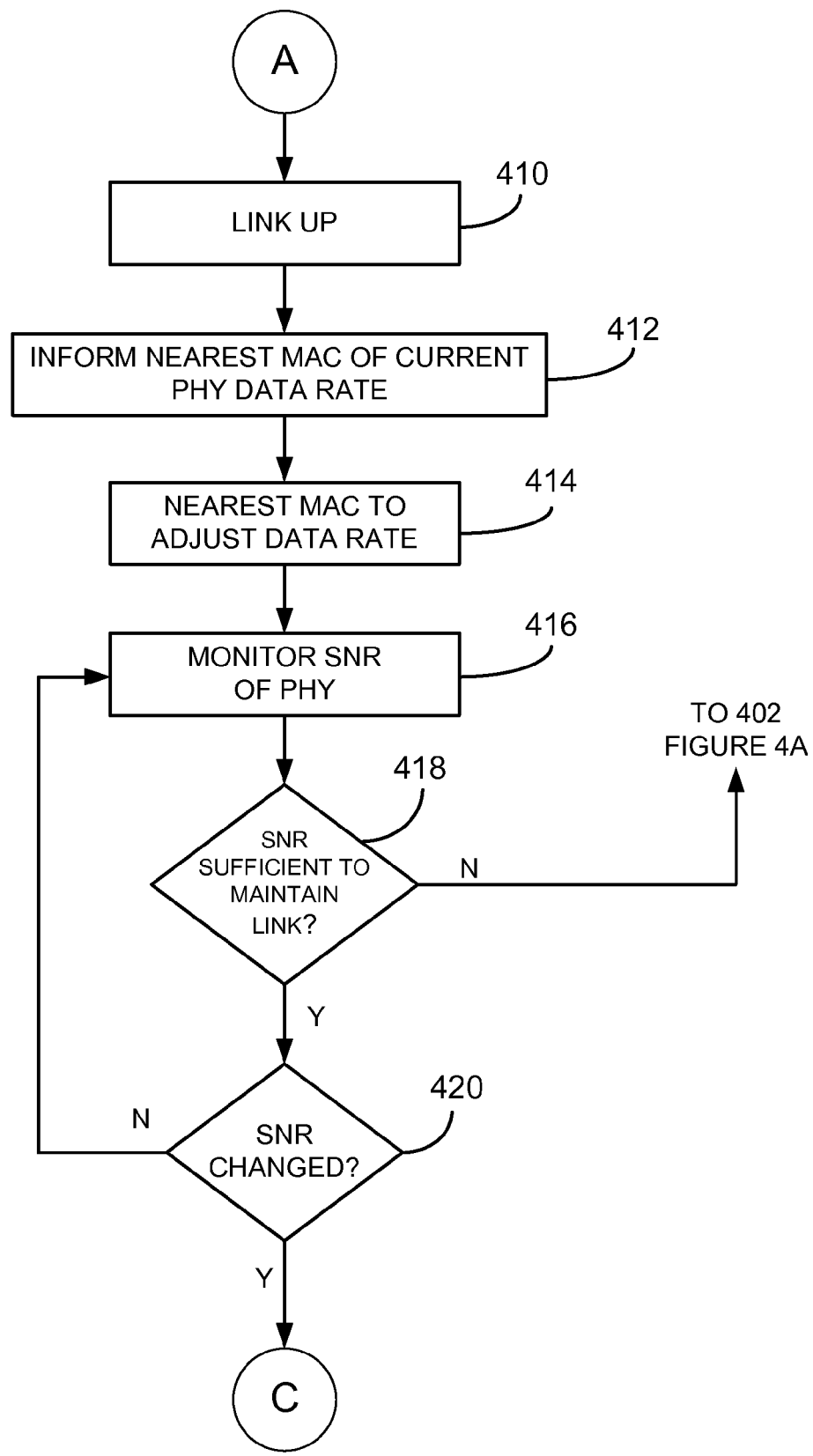
Figure 4C:
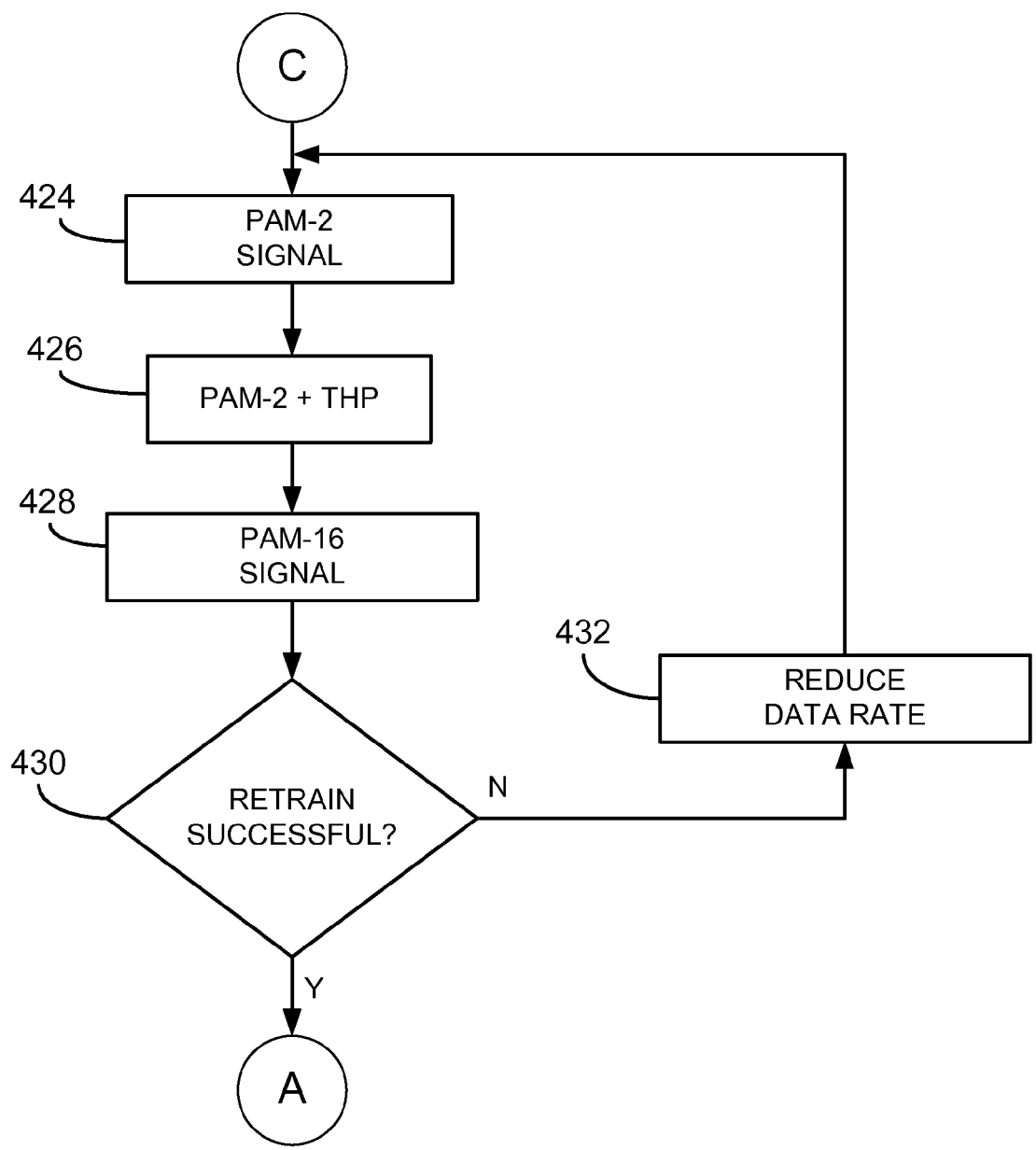

FIG. 4A-4C illustrate detailed steps involved in adapting MAC-to-PHY data rates when the PHY-to-PHY data rates change, thereby maintaining end-to-end operability of a 10GBASE-T link. Referring now to FIG. 4A, during an initialization or calibration sequence, an autonegotiation takes place, at step 402. Autonegotiation involves having the link partners communicate across the link to establish common conditions under which normal data communication will operate. The autonegotiation step may also include determining which communication standard to use (100Base-T, 10GBASE-T, etc.), and determining which of the link partners will be the Master and which one will be the Slave.

Following the autonegotiation step, at 402, a training step takes place, at 404. The training step may involve a sequence of PAM-2 signal transmissions (versus PAM-16 transmissions normally transferred during 10GBASE-T communications) to initially set various transmitter and receiver parameters. Further training sequences may transmit PAM-16 signals to more accurately tune various adaptive filters, equalizers, and timing components. An indication of the data rate capability of the link may be determined based on the initial training sequences. Based on the training sequences, a data rate of operation for PHY-to-PHY communications is determined and set, at step 406.

After the PHY data rate is determined, a further determination of whether the training was successful is carried out at step 408. This may involve a measurement of SNR or BER from representative signal transmissions. If the training appears unsuccessful, the link is brought down and the autonegotiation process started again, at 402. Continued unsuccessful training sequences iteratively cause the determined data rate to be reduced until the training passes. Once the training process reaches a successful state, an indication that the link is up and running is made, at step 410 (FIG. 4B, via bubble "A").

Further referring to FIG. 4B, once the link is up and running between the two link partner PHYs, the respective MACs are informed of the current maximum data rate, at step 412. This may be done via an in-band or out-of-band desired IPG control signal transmitted by the PHY to the MAC. If there is an incompatibility between the PHY data rate and the MAC data rate, the MAC IPG controller adjusts its data rate, at step 414.

When the MAC IPG controller adjusts its data rate (the data rate between the MAC and the PHY), the link is considered to be in normal operation. The SNR of the PHY is monitored, at step 416, and a determination made, at step 418, as to whether the SNR is sufficient to maintain the link in an operational state. If not, then the link returns to the autonegotiation step, at 402. If the SNR is sufficient, then a determination is made, at step 420, whether the SNR changed. If the SNR changed beyond a predetermined threshold, a fast retrain process is initiated, more fully described below. A fast retrain is a brief link training sequence that resets a minimal number of link parameters to allow for changes in link parameters without necessarily requiring the link to go offline. If the SNR did not change, then continued iterative monitoring of the SNR at step 416 and associated determinations at steps 418 and 420.

Referring now to FIG. 4C, the fast retrain sequence is an abbreviated series of steps taken to train the parameters of a link to change link parameters without the link necessarily going offline, or to quickly achieve fully-functional nominal operation after a link has been lost. A full training sequence is often not needed in many cases after a link is lost, as many of the transceiver parameters may remain the same after retraining. FIG. 4C is but one example of a fast retrain sequence. Further examples are described in U.S. patent application Ser. No. 12/604,358, titled "Fast Retraining For Transceivers in Communication Systems", filed Oct. 22, 2009, assigned to the assignee of the disclosure herein and incorporated by reference herein in its entirety.

Further referring to FIG. 4C, in one embodiment, the fast retrain sequence first provides a PAM-2 transmission sequence, at 424. The PAM-2 training sequence allows updating of transceiver parameters. THP precoding coefficients can also be determined and exchanged, and the receiver synchronized with precoded transmission data from the far-end link partner transmitter. In other embodiments, other types, modulations, or formats of signals can be used for training signals as appropriate.

The next step in the fast retrain involves transmitting a PAM-2 sequence with a Tomlinson-Harashima Precoding (THP) type of encoding, at 426. A PAM-16 signal is then transmitted as a training signal (such as one or more DSQ128 symbols, at 428), which allows receiver parameter adaptation to be performed under a signal that has the same characteristics as the signal used during nominal operation.

At step 430, a determination is made as to whether the fast retrain was successful. If so, operation of the link goes to the link up status (via bubble "A", FIG. 4B). Should the retrain fail, the data rate is reduced, at step 432, and the fast retrain sequence re-initiated until the retrain succeeds with an appropriate data rate.

Figure 5:
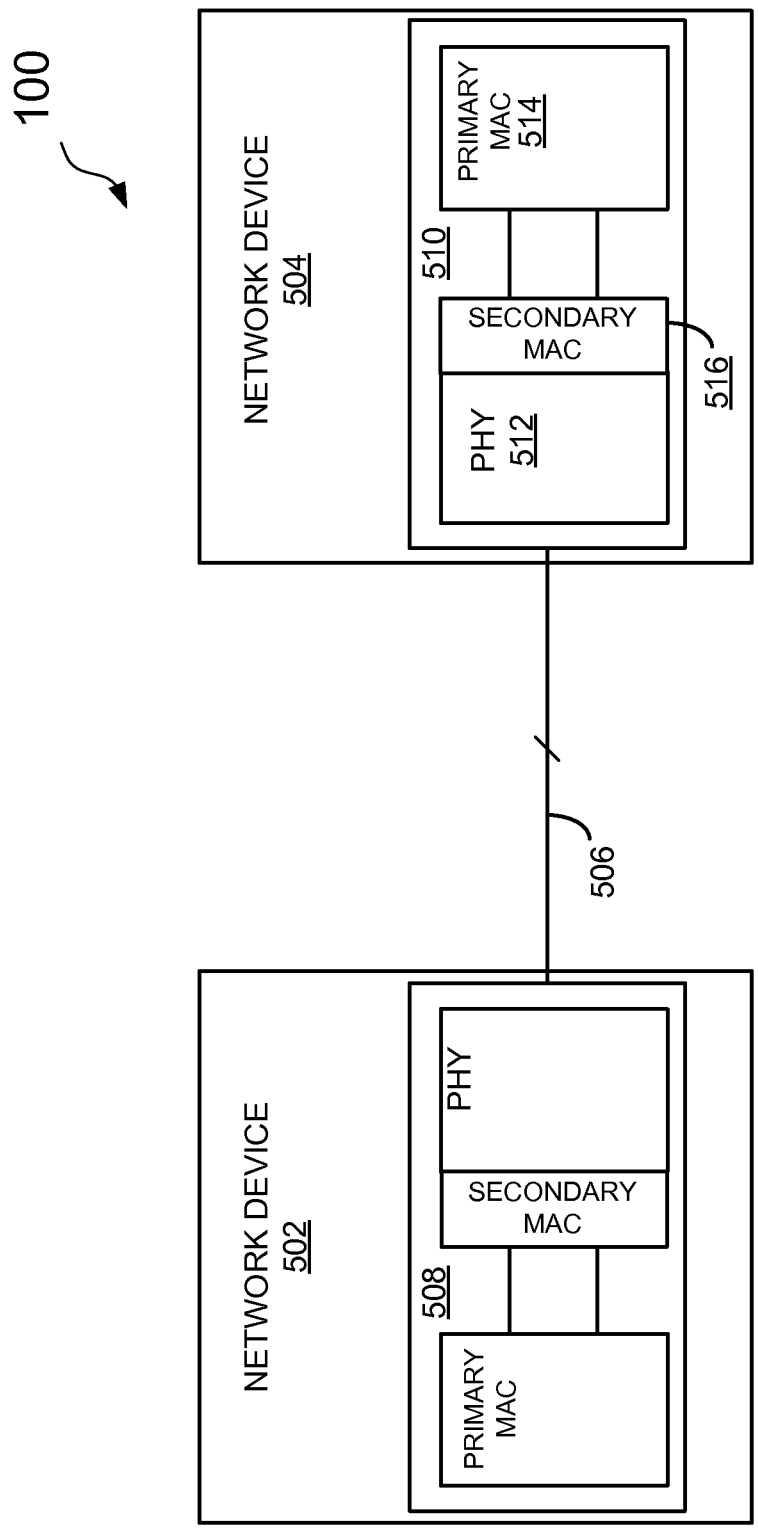
FIG. 5 illustrates an alternative embodiment of an end-to-end 10GBASE-T signaling link similar to FIG. 1.

FIG. 5 illustrates an alternative embodiment of an end-to-end 10GBASE-T link, generally designated 500. The link employs two network devices 502 and 504 coupled via a signaling link medium 506. Respective network interface circuits 508 and 510 are included in each network device. Each network interface includes a PHY circuit 512 and a primary MAC 514. However, to assist the link in adjusting data rates between the primary MAC and the PHY, a secondary MAC 516 is employed on the PHY integrated circuit. The secondary MAC functions to issue "pause" frames to the primary MAC so that the primary MAC can adjust its rate during operation via the IPG scheme described above, by inserting pause frames into the data stream, or through a combination of both techniques.

Those having skill in the art will appreciate the many benefits and advantages afforded by the embodiments presented herein. Of significant benefit is the ability to change 10GBASE-T data rates between the MAC and PHY circuits utilizing existing circuitry and resources within the 10GBASE-T standard architecture. Moreover, by being able to adaptively change the MAC data rate in response to changes in the PHY data rate, end-to-end operability along the link may be maintained in an online state without unnecessary link down time.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented.

With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A method of operation in an NBASE-T link, the method comprising:
   in a training mode of operation with the link operating in an offline state:
     performing a link training sequence comprising a predetermined number of training steps to establish a first PHY data rate between respective link partner PHY circuits,
   in a normal mode of operation with the link operating in an online state:
     transceiving first data, with a transceiver, between the respective link partner PHY circuits at the first PHY data rate;
     transferring second data, with the transceiver, between each PHY circuit and a corresponding primary MAC circuits at a MAC data rate;
     detecting, with rate control logic disposed in the transceiver, a change above a threshold level to a signaling parameter associated with the first data transfers between the link partner PHY circuits; and
     adjusting, with the rate control logic, the first PHY data rate between the PHY circuits to a second PHY data rate such that the signaling parameter returns to a nominal level, wherein the adjusting to the second PHY data rate is associated with a retrain sequence of training steps that are less than the predetermined number of training steps.

2. The method of claim 1 and further comprising:
   altering the MAC data rate to match the second PHY data rate.

3. The method of claim 1 wherein the first PHY data rate is 10 Gb/sec.

4. The method of claim 1 wherein the second PHY data rate is free to be above 1 Gb/sec.

5. The method of claim 1 wherein the signaling parameter comprises a signal-to-noise ratio (SNR).

6. A method of operation in an NBASE-T link, the method comprising:
- transceiving first data, with the transceiver, between respective link partner PHY circuits at a first selected PHY data rate during an online mode of operation, the first selected PHY data rate set to an initial rate during a training sequence of predetermined steps with the NBASE-T circuit in an offline mode of operation;
- transferring second data, with the transceiver, between each PHY circuit and a corresponding MAC circuit at a MAC data rate;
- detecting, with rate control logic disposed in the transceiver, a change from the first selected PHY data rate to a second selected PHY data rate during the online mode of operation, the change responsive to a change in a signaling parameter associated with the link;
- communicating the change in the PHY data rate with each of the PHY circuits to the respective primary MAC circuits;
- adapting the MAC data rate with the rate control logic to match the second selected PHY data rate; and
- carrying out a retrain sequence of training steps, with the transceiver, in response to the adapting without taking the link offline, the retrain sequence of steps comprising fewer steps than the predetermined steps.

7. The method according to claim 6, wherein communicating the change in the PHY data rate comprises:
- transmitting a control signal from the PHY circuit to the MAC circuit.

8. The method according to claim 7, wherein transmitting the control signal is done in-band.

9. The method according to claim 7, wherein transmitting the control signal is done out-of-band.

* * * * *